April 24, 1956
L. L. DAVENPORT
2,743,437
RADIANT ENERGY SYSTEM FOR THE MEASUREMENT
OF VELOCITIES OF OBJECTS MOVING IN SPACE
Filed Jan. 3, 1946
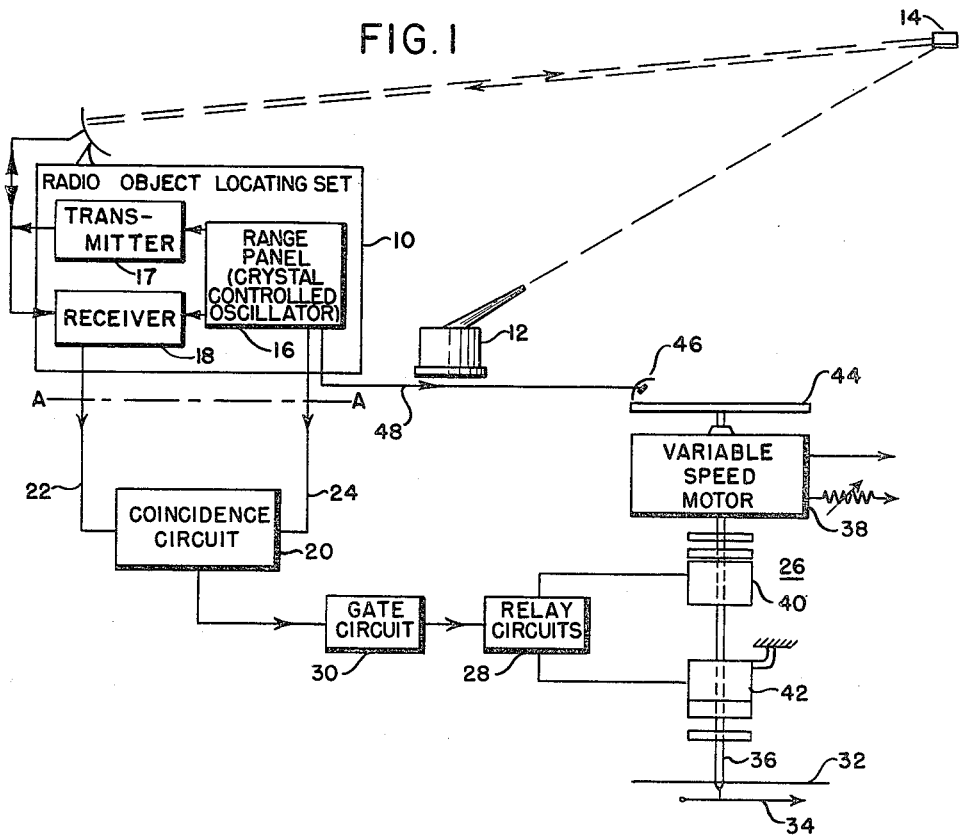
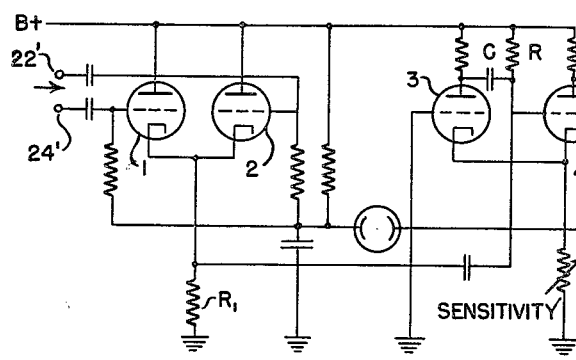
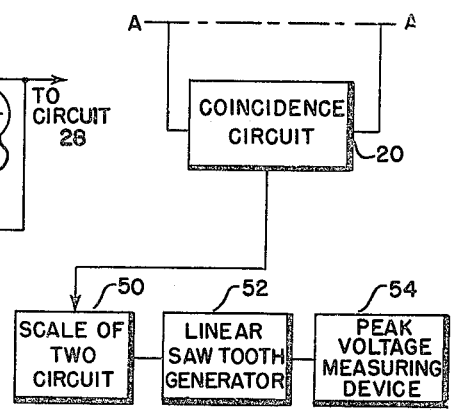
INVENTOR
LEE L. DAVENPORT
BY
William D. Hall
ATTORNEY

United States Patent Office 2,743,437
Patented Apr. 24, 1956

2,743,437

RADIANT ENERGY SYSTEM FOR THE MEASUREMENT OF VELOCITIES OF OBJECTS MOVING IN SPACE

Lee L. Davenport, Cambridge, Mass., assignor, by mesne assignments, to the United States of America as represented by the Secretary of War Application January 3, 1946, Serial No. 638,893

4 Claims. (Cl. 343—8)

This invention relates in general to velocity measuring apparatus, and more particularly to a radiant energy system for the measurement of velocities of objects moving in space.

In order to determine accurately fire control data for directing the firing of sizable artillery pieces such as heavy anti-aircraft guns, a number of ballistic conditions such as powder temperature, gun wear, atmospheric pressure, etc., which affect velocity must be supplied to the gun directors. Most of these data, however, can be ignored by measuring the actual velocity of a projectile for a given set of conditions. Thus, test rounds could be fired periodically from a battery and highly accurate firing data obtained from velocity measurement.

Accordingly, it is among the objects of my invention to provide apparatus adapted to making accurate measurements of velocities of projectiles. It is a further object to provide a system for velocity measurement which can be used in the field and does not possess the practical limitations of apparatus devised for use on testing grounds alone.

It is still another object of my invention to provide a system which can make use of components of a radiant energy object-locating system when such a system is associated with artillery pieces.

In general, my invention embraces the use of electrical apparatus for the cyclic transmission and reception of radiant energy pulses. These radiant energy pulses are transmitted towards a projectile in flight, are reflected from the projectile, and are received as echo pulses. The time interval between the transmission of a radiant energy pulse and the reception of its echo from the projectile is a measure of the distance from the source of transmission to the projectile. Thus, the time interval can be measured between two points at known distances along the path of the projectile and these data are sufficient to determine the velocity of the projectile.

Since, in many instances, artillery pieces are associated with a radiant energy object-locating system, such as is disclosed in the application of Louis N. Ridenour, Serial No. 516,299, filed December 30, 1943, now U. S. Patent 2,473,175, issued June 14, 1949, it is convenient and practical to use such a system for the tracking of a projectile, and for providing electrical signals indicative of the position of the projectile. Such electrical signals may be impressed on a coincidence circuit along with timing pulses so that the change in position or distance of the projectile can be timed. The control signals developed by the coincidence circuit may be used to actuate apparatus calibrated to indicate velocity directly, or to indicate time intervals for the projectile to travel known distances.

A further comprehension of the invention may be obtained from the detailed description that follows, read with reference to the appended drawing, in which:

Fig. 1 is a block diagram of one embodiment of the velocity measuring system;

Fig. 2 is a circuit diagram of a coincidence and gate circuit which may be used in this invention;

Fig. 3 is a block diagram of a modification of part of the velocity measuring system.

Figure 4:
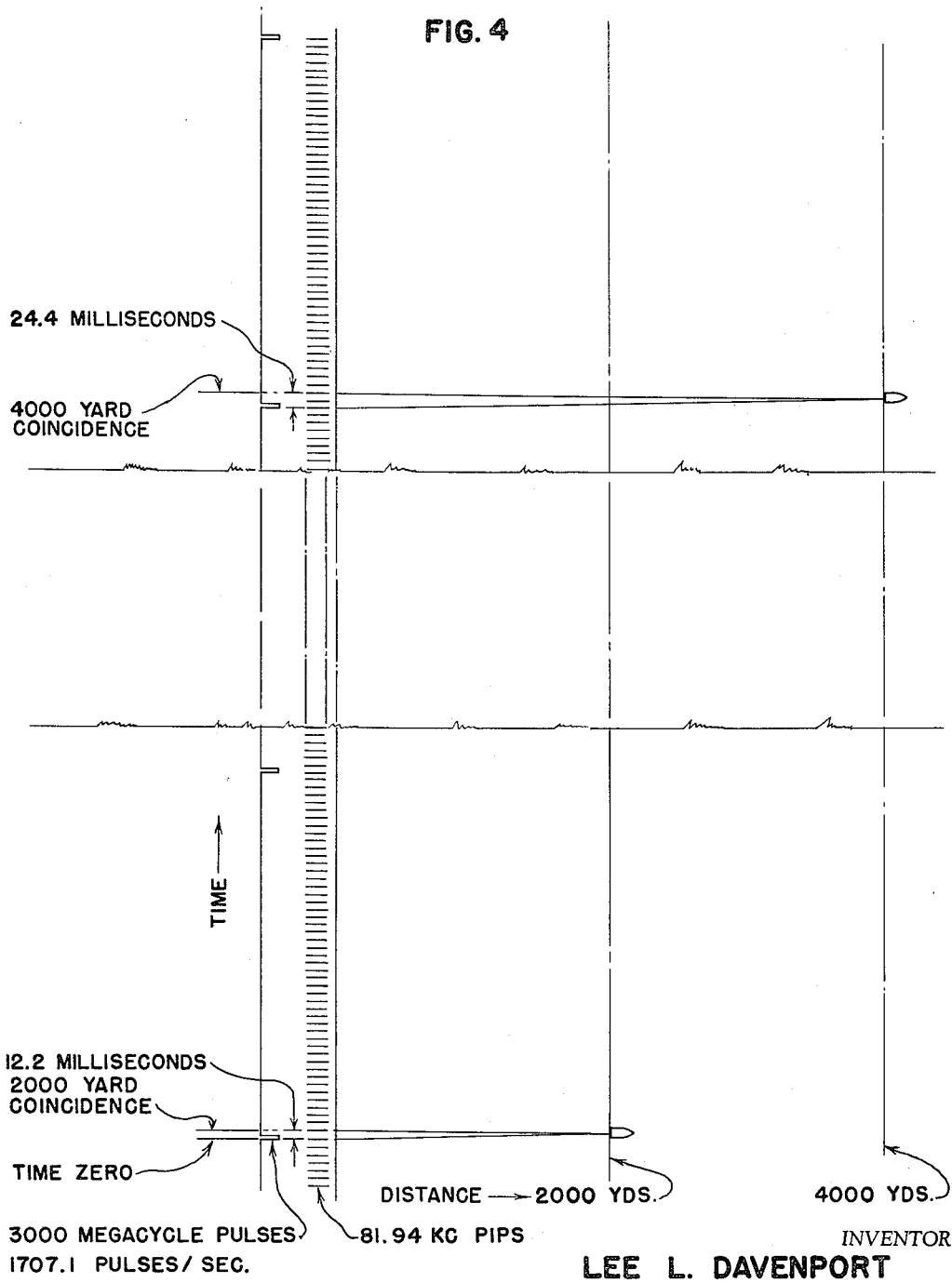
Fig. 4 is a graph illustrating operation of the equipment.

With reference to Fig. 1, there is shown an arrangement for determining or measuring the velocity of a projectile from an artillery piece, such as an anti-aircraft gun. The arrangement measures the average velocity of the projectile between preselected positions or locations along the projectile's trajectory or path of travel in space. The value so obtained may be readily substituted in suitable formula well known in the ballistics art for translating the determined value of average velocity into muzzle velocity. In Figure 1, 10 represents a radiant energy or radio object-locating set or apparatus associated with an artillery piece or gun 12 from which a projectile 14 may be discharged. The apparatus 10 may be of the type disclosed in Ridenour application Serial No. 516,299, filed December 30, 1943, from which pulses of high frequency wave energy are radiated into space and to which echo or reflected pulses are returned from an object or objects in the space on which the transmitted pulses have impinged. The apparatus may include a crystal controlled oscillator 16 for generating a high frequency wave. In a specific application, the high frequency wave output of this oscillator was 81.94 kilocycles per second, and the radiant energy output of the set 10 was of a frequency of approximately 3000 megacycles per second at the repetition rate of 1707.1 pulses per second, this being 1/48 of the oscillator frequency. Suitable electronic means were incorporated in the crystal oscillator circuit for the generation of pips through the use of an associated resonant peaking circuit. The pips were generated in exact synchronism with the oscillator frequency and each 48th pip was selected as the trigger for the radiant energy output of the set 10. The crystal oscillator plate circuit was tuned to resonance at the 81.94 kilocycle frequency and pips were generated at this frequency by a second damped resonant circuit tuned to a considerably higher frequency in the cathode circuit of the oscillator tube. Any device utilizing the nonsinusoidal wave nature of the current passed by a vacuum tube oscillator is capable of generating a distorted wave form; properly chosen, the device can generate pips. The spacing between the 81.94 kilocycle pips corresponded to a radar change of exactly 2000 yards, which, for a specific application of the invention, was chosen as the distance between a first timing and a second timing position or location in space of the projectile whose velocity was to be measured. The distance in space that the object-locating wave traveled between successive 81.94 kilocycle pips was exactly 4000 yards. This apparatus also included a high frequency receiver 18 responsive to the echo pulses or radiant energy reflected from an object in space.

Attention is now invited to Fig. 4. Assuming that at time zero a pulse of 3000 megacycle radiation is transmitted, this pulse will travel outward a distance of 2000 yards, be reflected should a projectile be at that point, and return to the receiver in approximately 12.2 microseconds. Since 12.2 microseconds is also the time between successive 81.94 kilocycle pips, it is clear that a circuit which will indicate coincidence between any pip and a return echo will show an output at this point. Similarly, at distances of 4000; 6000; 8000 yards, etc., these coincidences will occur. A measurement of the time between, say the 2000 yard and 4000 yard coincidences will permit calculation of the average velocity of the projectile through this interval. 20 represents a coincidence circuit into which are simultaneously transmitted, as indicated by the arrow heads in the transmission paths 22, 24, the echo pulses returned to the receiver and normally used to control the automatic tracking apparatus of the set, and the high frequency pips from the range panel oscillator 16. The coincidence circuit 20 is connected to timing apparatus 26 through relay circuits 28. It may be desired to incorporate a suitable gate circuit 30 between the coincidence and relay circuits to ensure sufficient amplitude and duration to the pulses from the coincidence circuit.

The timing apparatus 26 may comprise a suitably calibrated dial 32 and associated rotatable pointer or indicator 34, the latter being mounted on one end of a shaft 36 adapted to be driven or rotated by the adjustable speed motor 38 and controlled by magnetic clutches 40, 42. To drive the pointer at an accurately known speed, the motor 38 may be used with a stroboscopic timing disk 44. The stroboscopic light 46 may be a neon-filled bulb 46 controlled through transmission path 48 from the output of the range panel, and the disk 44 may be provided with a known number of dots or bars depending on the desired speed of the motor. With the latter adjusted to the desired speed, it will not vary appreciably, due to its inertia, during the flight of the projectile. Magnetic clutch 40 is adapted to connect the pointer shaft 36 to the motor 38 upon receipt of the initial timing pulse at the relay circuit from the coincidence circuit, and magnetic clutch 42 is adapted to disconnect the pointer shaft abruptly from the motor upon receipt of the final timing pulse at the relay circuit from the coincidence circuit. Obviously, other types of timing apparatus than that described immediately hereinabove may be employed. For example, a variable speed motor may be arranged to drive a disk carrying suitably calibrated sensitized or wax paper. The output of the coincidence circuit may be fed to an electrode mounted adjacent the wax paper, whereby upon receipt of each output pulse from the coincidence circuit, an electric discharge from electrode to the disk punctures the paper. Another timing apparatus might comprise merely a suitable electronic switching circuit connected to the output of the coincidence circuit and, in turn, feeding into a bank of scale-of-two counters. Fig. 3 shows still another timing apparatus that may replace that portion of the circuit of Fig. 1 below the line A—A. It comprises a suitable multivibrator or electronic switch circuit 50 controlled by the output from the coincidence circuit, and in turn controlling a linear sawtooth generator 52, the output of the latter being transmitted to a peak voltage measuring device or meter 54. In the arrangement of Fig. 3, the switch circuit 50, upon receiving an initial pulse from the circuit 20, causes operation of the sawtooth generator, the output voltage of the latter being indicated by the device 54. Upon receipt of a second pulse at the switch circuit 50, the sawtooth generator is deenergized, the voltage indicated by the meter when the sawtooth wave is cut off being a value proportional to the time of flight of the projectile between known or selected points.

The coincidence circuit 20 may have the configuration shown in Fig. 2. It comprises a plurality of vacuum tube triode sections 1, 2, 3, 4, and suitably proportioned grid, cathode and plate circuit resistors and coupling condensers. The effective time constant or delay of the circuit is determined primarily by the values of resistor R and condenser C. The output of the receiver is applied to the grid of triode section 2 through input terminal 22', and the high frequency pips from the range panels 16 are applied to the grid of triode section 1 through the input terminal 24'. The triode sections 1, 2 are connected in cathode follower arrangement, with the resistor R1 common to their cathodes. The voltage developed across R1 is applied to the grid of triode section 4, and, if it is of sufficient amplitude, that is, when the pips input to terminal 24' and the receiver pulses input to terminal 22' are coincident, triode section 4 abruptly conducts an increased electron flow thereby raising the potential of its cathode. The grid of triode section 3 being grounded, it is effectively driven more negative, thereby decreasing electron flow through triode section and raising the anode potential of section 3. In multivibrator fashion, the grid of section 4, being connected through condenser C to the anode of section 3, is effectively driven more positive, and thus a trigger or gate circuit 30 is provided at the output of the coincidence circuit 20. The length or duration of the trigger or gate is determined primarily by the values of R and C. The discharge device disposed between the anode of tube 4 and the grid resistors of tubes 1 and 2 acts in conjunction with a capacitor electrically disposed between one of the gas tube elements and ground to hold the grid bias of tubes 1 and 2 in the quiescent state. That is, on conduction of tube 4, a large negative going pulse is transmitted through the discharge device to cause its connected capacitor to hold tubes 1 and 2 grid bias a length of time corresponding to the RC time constant of the resistor disposed between B+ and this capacitor. This capacitor also prevents spurious firing of tubes 1 and 2. It should be further noted that feedback through the discharge device causes decreased conduction through the cathode follower cathode resistor which negative going pulse is coupled to the grid of tube 4 restoring the gate to initial condition.

In the practice of the invention, it may be considered desirable to determine the velocity of the projectile on the basis of the time required for the projectile to travel a preselected distance after it has initially traversed a portion of its flight. During flight of the projectile, successive radiant energy pulses radiated by the object locating set will impinge on the projectile and be reflected back to the set. With the pulse repetition rate known, as well as the frequency output of the oscillator, the distance between the initial timing and the final timing positions of the projectile may be chosen so as to bear a preassigned or definite relation to the distance of travel of electromagnetic radiation during the intervals between successive pips of the high frequency pips transmitted to the coincidence circuit from the range panel. If, for example, these two distances should be the same or approximately equal, the initial timing pulse and final timing pulse may be correlated to successive high frequency pips whereby the coincidence of an echo pulse and a high frequency pip would be required to operate the coincidence circuit and, thereby, the initiation and cessation of operation of the timing apparatus.

Although this invention has been disclosed with reference to certain specific configurations, obviously it is not restricted thereto but is of a scope evidenced by the prior art and the appended claims.

What is claimed is:

1. In an apparatus for measuring the velocity of a projectile, radio object-locating apparatus including means for radiating high frequency electromagnetic wave energy in pulses at a high repetition rate in a direction to impinge upon the projectile and be reflected therefrom, means for detecting the reflected wave energy, a source of timing wave energy, said timing wave energy being in pulses at intervals bearing a known relation to a predetermined distance of travel of the projectile, a coincidence circuit, means connecting said means for detecting and said source of timing wave energy with said coincidence circuit to produce output signals in response to successive coincidences of said reflected wave energy and said timing wave energy, a speed dial, an indicator movable over said dial in indicating relation therewith, power driving means, clutch means operable to connect and disconnect said dial and driving means, and means responsive to successive output signals from said coincidence circuit to operate said clutch means to first connect and then disconnect said indicator and driving means, whereby said indicator indicates on said dial the speed of the projectile over said predetermined distance.

2. An apparatus as recited in claim 1, stroboscopic disc means connected to be driven by said power driving means, a stroboscopic lamp positioned to illuminate said disc means, and a circuit connecting said lamp and said source of timing wave energy.

3. In an apparatus to measure the velocity of a projectile in flight, means for radiating high-frequency electromagnetic wave energy in pulses at a high repetition rate and for directing the same onto a projectile in flight, means for detecting the wave energy reflected from said projectile, a source of timing wave energy, said timing wave energy being in pulses at intervals bearing a known relation to a predetermined distance of travel of the projectile, a coincidence circuit, means combining the signals from said means for detecting and said source of timing wave energy to produce output signals in response to successive coincidences of said reflected wave energy and said timing wave energy, a velocity indicator, a driving motor, first and second electromagnetic clutches in series connecting said motor and indicator, and means for energizing said clutches in response to respective successive output signals.

4. In apparatus for measuring the velocity of a body moving in space by measuring the time required for its movement through a preselected distance in said space, radar object-locating apparatus including a source of timing pulses of a repetition frequency such that said pulses occur at intervals corresponding to the radar travel time of electromagnetic radiation for said preselected distance, means connected to said source of timing pulses and for radiating high frequency electromagnetic wave energy in pulses in a direction to impinge upon said moving body and at a repetition frequency which is a submultiple of said timing pulse frequency, means for detecting reflected pulses of said radiated high frequency energy echoing from said body, a coincidence circuit connected to said detecting means and to said timing pulse source and adapted, responsive to coincidences of said reflected pulses and said timing pulses, to produce output signals, and means measuring the time interval between successive output signals of said coincidence circuit.

References Cited in the file of this patent
UNITED STATES PATENTS

| | | |
|---|---|---|
| 1,924,174 | Wolf | Aug. 29, 1933 |
| 2,402,464 | Suter | June 18, 1946 |
| 2,403,527 | Hershberger | July 9, 1946 |
| 2,404,527 | Potopenko | July 23, 1946 |
| 2,405,597 | Miller | Aug. 13, 1946 |
| 2,406,358 | Doba | Aug. 27, 1946 |
| 2,422,157 | Wolff | June 10, 1947 |